(12) United States Patent
Thiagarajan

(10) Patent No.: US 11,609,306 B2
(45) Date of Patent: Mar. 21, 2023

(54) SYSTEM, METHOD AND DEVICE FOR EFFICIENT PROCESSING OF FMCW RADAR SIGNALS IN A RADAR RECEIVER

(71) Applicant: MMRFIC Technology Pvt. Ltd., Bangalore (IN)

(72) Inventor: Ganesan Thiagarajan, Bengaluru (IN)

(*) Notice: Subject to any disclaimer, the term of this patent is extended or adjusted under 35 U.S.C. 154(b) by 251 days.

(21) Appl. No.: 17/074,995

(22) Filed: Oct. 20, 2020

(65) Prior Publication Data
US 2021/0124017 A1    Apr. 29, 2021

(51) Int. Cl.
*G01S 7/40* (2006.01)
(52) U.S. Cl.
CPC .......... *G01S 7/4056* (2013.01); *G01S 7/4069* (2021.05)
(58) Field of Classification Search
CPC .............................. G01S 7/4056; G01S 7/4069
See application file for complete search history.

(56) References Cited

U.S. PATENT DOCUMENTS

2021/0318424 A1* 10/2021 Wang ................... G01S 7/288

* cited by examiner

*Primary Examiner* — Timothy A Brainard
*Assistant Examiner* — Helena H Seraydaryan

(57) ABSTRACT

According to an aspect, method in a radar receiver system comprising, receiving a radar signal reflected from a target on a plurality of antennas, wherein the radar signal is a frequency modulated continuous wave (FMCW) signal comprising plurality of chirps, extracting a plurality of range bins from the radar signal, generating a plurality of reference angles and a plurality of reference velocities from a plurality of reference parameters, determining a plurality of reference weights from the plurality of reference angles and plurality of reference velocities, filtering the radar signal with the filter weights set to equal to the plurality of reference weights.

11 Claims, 8 Drawing Sheets

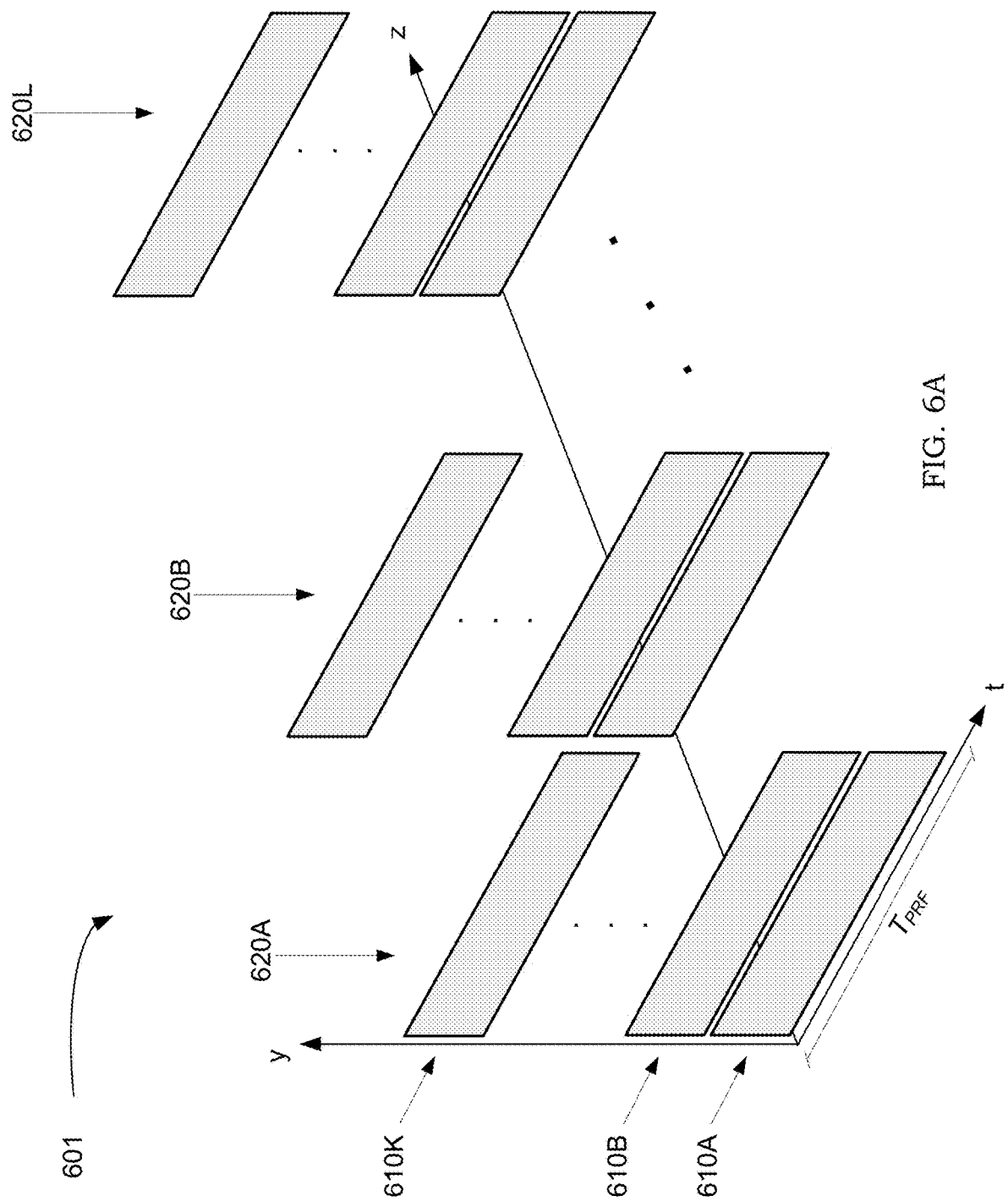

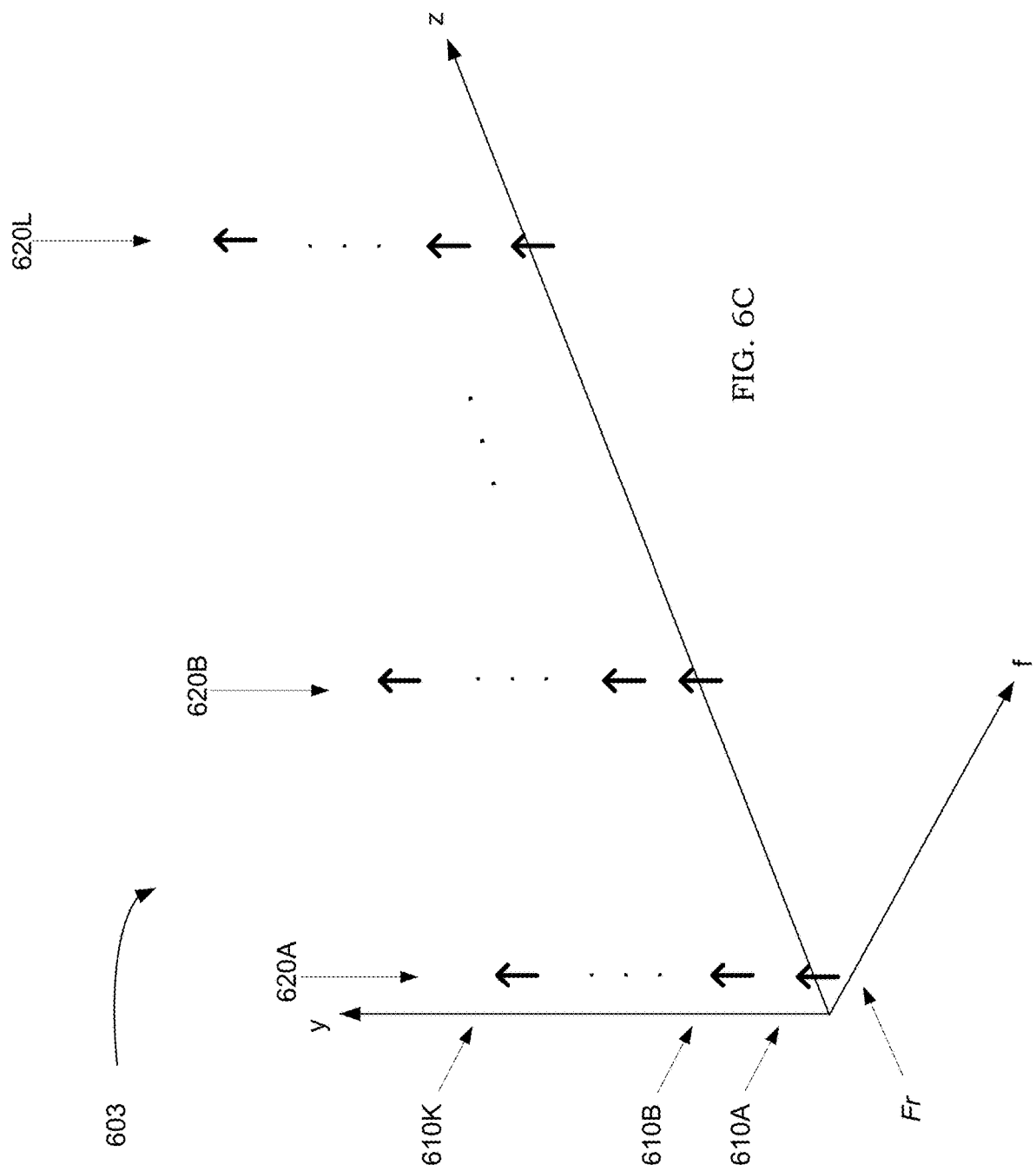

SYSTEM, METHOD AND DEVICE FOR EFFICIENT PROCESSING OF FMCW RADAR SIGNALS IN A RADAR RECEIVER

CROSS REFERENCES TO RELATED APPLICATIONS

This application claims priority from Indian patent application No.: 201941036378 filed on Oct. 24, 2019 which is incorporated herein in its entirety by reference.

TECHNICAL FIELD

Embodiments of the present disclosure relate to Radars and more particularly relate to system, method and device for efficient processing of FMCW radar signals in a radar receiver.

RELATED ART

In a radar system, a radio frequency (RF) signal is transmitted on a radar transmitter and a reflection of the RF signal from one or more objects is received on a radar receiver. The transmitted RF signal and the received RF signal are correlated to determine one or more parameters like range, velocity, direction of the one or more object, as is well known.

Conventionally, different types of RF signals are employed in a radar system and accordingly the radar systems are recognized by the type of RF signal employed for transmitting. For example, in pulse radar system, a pulse-modulated RF signal (an RF pulse or train of pulses) is transmitted, and in a continuous wave frequency modulated (CWFM) radar system, a linearly varying frequency RF signal is transmitted. The received RF signal in pulse radar system and CWFM radar system are processed in conjunction with the corresponding transmitted signal.

Often, plurality of antennas are employed for transmitting, receiving and/or for both, in a multiple input and multiple outputs (MIMO) configuration for beamforming (both/either for transmitting and receiving) and determining the angle (azimuth/elevation). The radar systems are typically used in military and industrial applications, and more recently have been employed in civilian applications. In particular, 77 GHz millimeter wave (mm wave) radars find their applications for automobile tracking, to assist pedestrians and cyclists, for example. Thus, high resolution and more accurate determination of object, and its parameters like velocity, angle etc., are of importance.

Several challenges are posed in determining the objects and it parameters. For example, only a fraction of the transmitted signal is reflected back to the receiver, thus, whenever the target with small RCS (Radar Cross Section) is close to another large reflecting surface (such as ground surface), the reflection from the true target is submerged in the stronger spurious reflection present in the background, for example. Such strong spurious reflection from the ground, buildings, etc, is known as clutter and it reduces the SNR of the reflected signal from the desired target.

As is well-known, in a pulsed radar system, space time array processing (STAP) technique is employed to suppress/reduce the effective of clutter. In that, signals from different antennas are combined with their time-delayed counterparts across the pulse train.

Several conventional radar systems and the techniques thereof are described in the literatures: a) S. Patole et al., Automotive Radars: A review of Signal Processing Techniques, IEEE Signal Processing Magazine, March 2017, b) J. L. Eaves et al., Principles of Modern RADAR," Edited, International Thomson Publishing, 1987, c) J. Ward, "Space-time adaptive processing for airborne radar," 1995 International Conference on Acoustics, Speech, and Signal Processing, Vol. 5, pp. 2809-2812, Detroit, Mich., USA, 1995, d) D. E. Barrick, "FM/CW Radar Signals and Digital Processing, NOAA Technical Report ERL 283-WPL26, July 1973, e) H. Rohling, "RADAR CFAR thresholding in clutter and multiple target situations", IEEE Trans. on Aerospace and Electronic Systems, Vol. 19, No. 4, pp. 608-621, July 1983, and Texas Instruments Application Note No. SWRU508B,"AWR1642 Evaluation Module (AWR1642BOOST: Single-Chip mm-Wave Sensing Solution", April 2018. titled Multibeam Antenna Technologies for 5G Wireless Communications by Wei Hong, et al, published in IEEE transactions on antennas and propagation, vol. 65, no. 12, December 2017, which are incorporated herein by reference.

SUMMARY

According to an aspect, method in a radar receiver system comprising, receiving a radar signal reflected from a target on a plurality of antennas, wherein the radar signal is a frequency modulated continuous wave (FMCW) signal comprising plurality of chirps, extracting a plurality of range bins from the radar signal, generating a plurality of reference angles and a plurality of reference velocities from a plurality of reference parameters, determining a plurality of reference weights from the plurality of reference angles and plurality of reference velocities, filtering the radar signal with the filter weights set to equal to the plurality of reference weights.

According to another aspect, the method comprises sampling the radar signal to generate a plurality of samples in time domain and Fourier transforming the plurality of samples to extract the plurality of range bins for every chirp in the plurality of chirps, wherein the plurality of chirps comprising K number of chirps, the plurality of antennas comprising L number antennas arranged according to a geometry and the plurality of range bins comprising T*K*L, in that the T is the number of range bins per chirp, generating the plurality of first reference vectors representing reference angles from the antenna array geometry, in that the dimension of the first reference vectors is equal to L, and generating the plurality of second reference vectors representing velocity from a one or more parameters of the radar signal and a reference target distance, in that the dimension of the second reference vectors is equal to K.

According to another aspect, the linearised matrix formed from the plurality of range bins T*K*L comprising plurality of matrices across the plurality of chirps K and the plurality of antennas L for corresponding ones of plurality of range bins T. The plurality of weights is applied to filter the radar signal received after the determination of the plurality of weight.

According to another aspect, the method comprising, splitting the linearised matrix formed from the plurality of range bins T*K*L, into a M number of segments to form a subset of received radar signal, forming covariance and inverse of subset of radar signal; in the subset of radar signal, determining a subset of weights corresponding to subset of radar signal, filtering the subset of radar signal by applying the weights to the subset of radar signals to generate a subset of filtered radar signal, combining the subset of filtered radar signal to form a clutter free radar signal.

According to another aspect, a radar receiver system receiving frequency modulated continues wave (FMCW) radar signal comprising a buffer configured to store plurality of samples over an each chirp in the plurality of chirps of the FMCW radar signal received on the plurality antennas arranged in one or more dimension, Fast Fourier transformer operative to performs FFT operation on the plurality of samples of every chirp to generate a plurality of frequency bins, memory configured to store the plurality frequency bins, inverse transformer operative to generate plurality of inverse matrices by performing matrix inverse operation of each matrix of corresponding ones in the plurality of frequency bins, reference data generator configured to generate linearised reference data comprising reference angles and reference velocities, filter weights generator operative to determine optimal weights using the plurality of inverse matrices and the linearised reference data, clutter filter operative to apply the optimal weights to the FMCW radar signal to generate a clutter free radar signal, energy density threshold detector operative to detect the valid range, velocity and angles that are above a threshold in the clutter free radar signal.

BRIEF DESCRIPTION OF DRAWINGS

FIG. 6A illustrates the example received signal for processing in the perspective of 3D data cluster 601.
FIG. 6C illustrates an example two dimensional data selected for the processing.

DETAILED DESCRIPTION OF THE PREFERRED EXAMPLES

Figure 1:
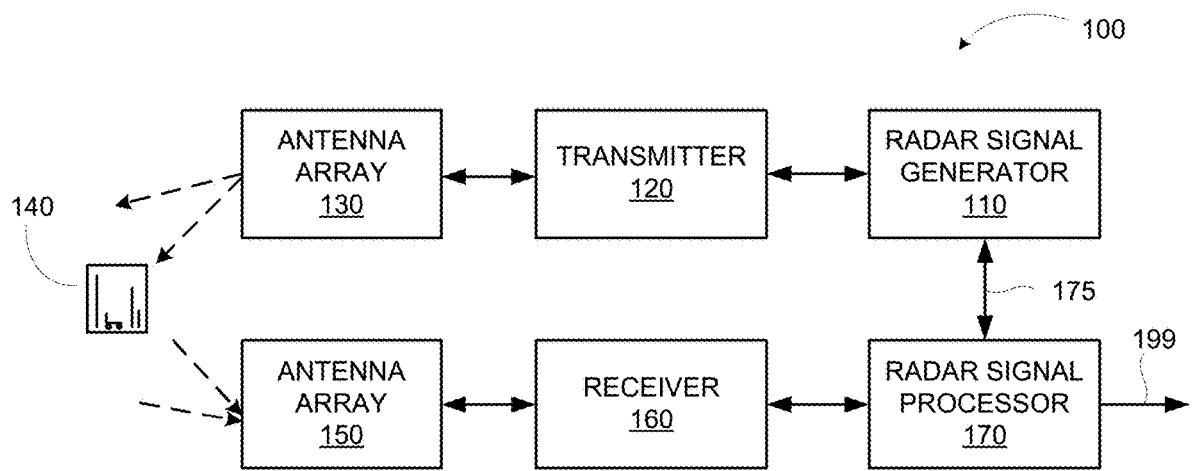
FIG. 1 is an example radar system in an embodiment.

FIG. 1 is an example radar system in an embodiment. The radar system 100 is shown comprising radar signal generator 110, transmitter 120, antenna array 130 and 150, reflecting objects 140, receiver 160, and radar signal processor 170. Each element is further described below.

Figure 2:
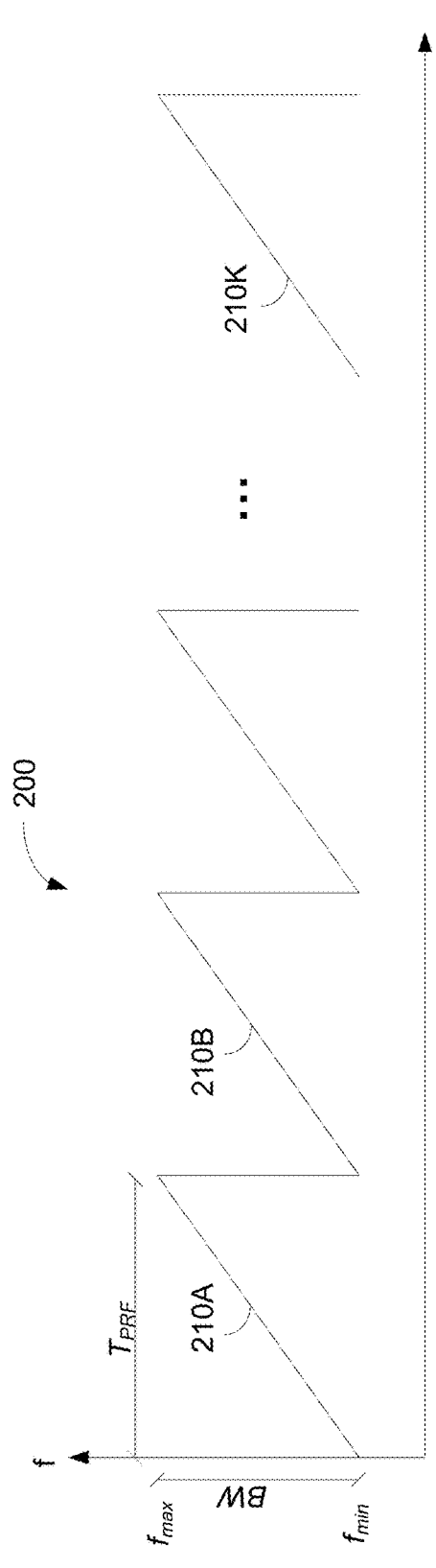
FIG. 2 is an example FMCW radar signal.

The radar signal generator 110 generates frequency modulated continuous wave (FMCW) radar signal referred to as chirp(s). A predefined number of chirps (for example, 128 chirps) within a time period are provided as radar signal. An example FMCW radar signal is depicted in FIG. 2. In the Figure, X-axis represents time and Y-axis represents frequency. As shown there, the FMCW radar signal 200 is shown comprising number of chirps 210A-K with each chirp sweeping (varying in frequency) between $f_{Min}$ and $f_{max}$ in a time span of $T_{PRF}$ with 100% duty cycle, as an example, and not limiting thereto. The radar signal generator 110 provides FMCW radar signal 200 to the transmitter 120.

The transmitter 120 performs several signal conditioning operations such as up conversion, filtering, signal conditioning for example, to prepare the radar signal 200 for transmission over the antenna array 130. Further, the transmitter 120 may also perform beamforming to transmit the radar signal 200 in a desired direction. The radar signal as prepared for beamforming and with desired frequency and strength is provided to the antenna array 130. The antenna array 130 may be a one dimensional or two dimensional array of antenna elements that are selectively transmit the signal as provided by the transmitter 120. For example, a phase shifted versions/copies of a chirp may be prepared by the transmitter 120 and provided to the elements of the array for transmission.

The reflecting objects 140 (also referred to as target) may comprise stationary objects, moving objects and clusters thereof. Accordingly, several parameters such as range, velocity, azimuth and elevation angles of an object of specific interest need to be determined accurately.

Figure 3:
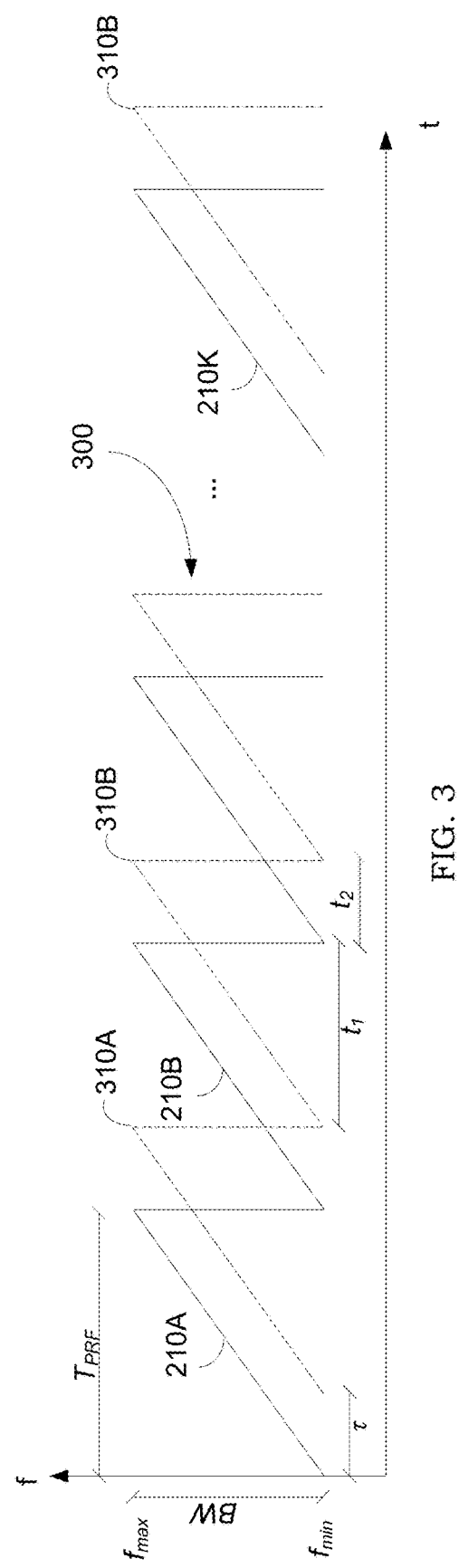
FIG. 3 is an example reflected radar signal.

The (receiving) antenna array 150 receives the reflected radar signal that is the reflection of the transmitted radar signal 200 from the objects 140. The antenna array 150 may comprise plurality of antenna elements. The reflected radar signal may be received over plurality of antennas (antenna array 150). An example reflected radar signal is depicted in FIG. 3. In that, the received reflected radar signal 300 is depicted as chirps 310A-K (shown along with the transmitted chirps 210A-K for comparison).

As shown in FIG. 3, the delay (τ) represents the delay between the transmitted signal (say 200) and the received signal (300). As shown there, the delay τ has introduced two region $t_1$ and $t_2$ within each received chirp in comparison with the transmitted chirp. The region $t_1$ may be considered for determining the object and its parameters and the region $t_2$ may be neglected as it may be negligible when the total duration $T_{PRF}$ is high and/or the distance between the Radar and Target is not very large.

Figure 4:
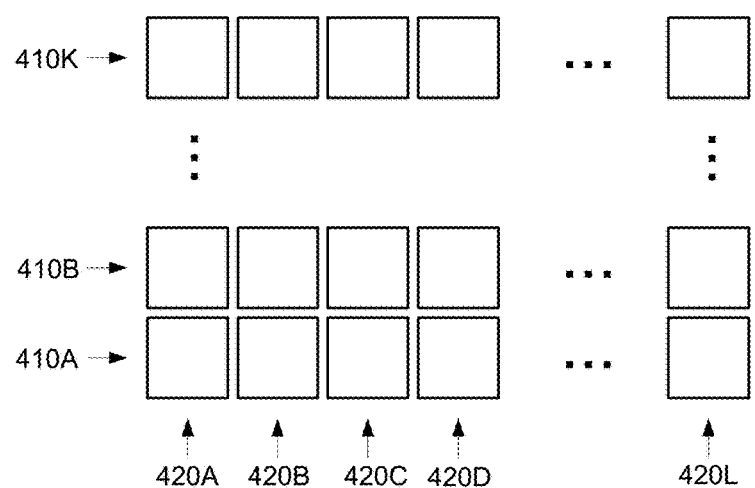
FIG. 4 is an example reflected radar signal received on plurality of antennas in the receiver.

The receiver 160 receives the reflected radar signal 300 from the antenna array 150. For example, each antenna element in the plurality of antenna elements of the array 150 may provide the reflected radar signal 300 to the receiver 160. The receiver, 160 may perform one or more of signal conditioning operations such as filtering, amplification, down conversion and sampling etc., on the reflected radar signal received from each of the plurality of antenna elements received. FIG. 4 is an example reflected radar signal 400 received by the receiver 160. As shown there, 410A-410K represents the K number of reflected chirps, 420A-420L representing the antenna elements in the antenna array 150. Accordingly, the two dimensional graph represents the signal received by L number of antennas corresponding to the transmitted signal 200.

The radar signal processor 170 operate on the received radar signal 400 to determine the several parameters of the object 140. In one embodiment, the radar signal process reduce the effect of clutters in the received signal 400 for more accurate determination of the objects, in particular moving objects in relation to other stationary objects. The manner in which the radar signal processor 170 process the received signal 400 in an embodiment is further described below.

Figure 5:
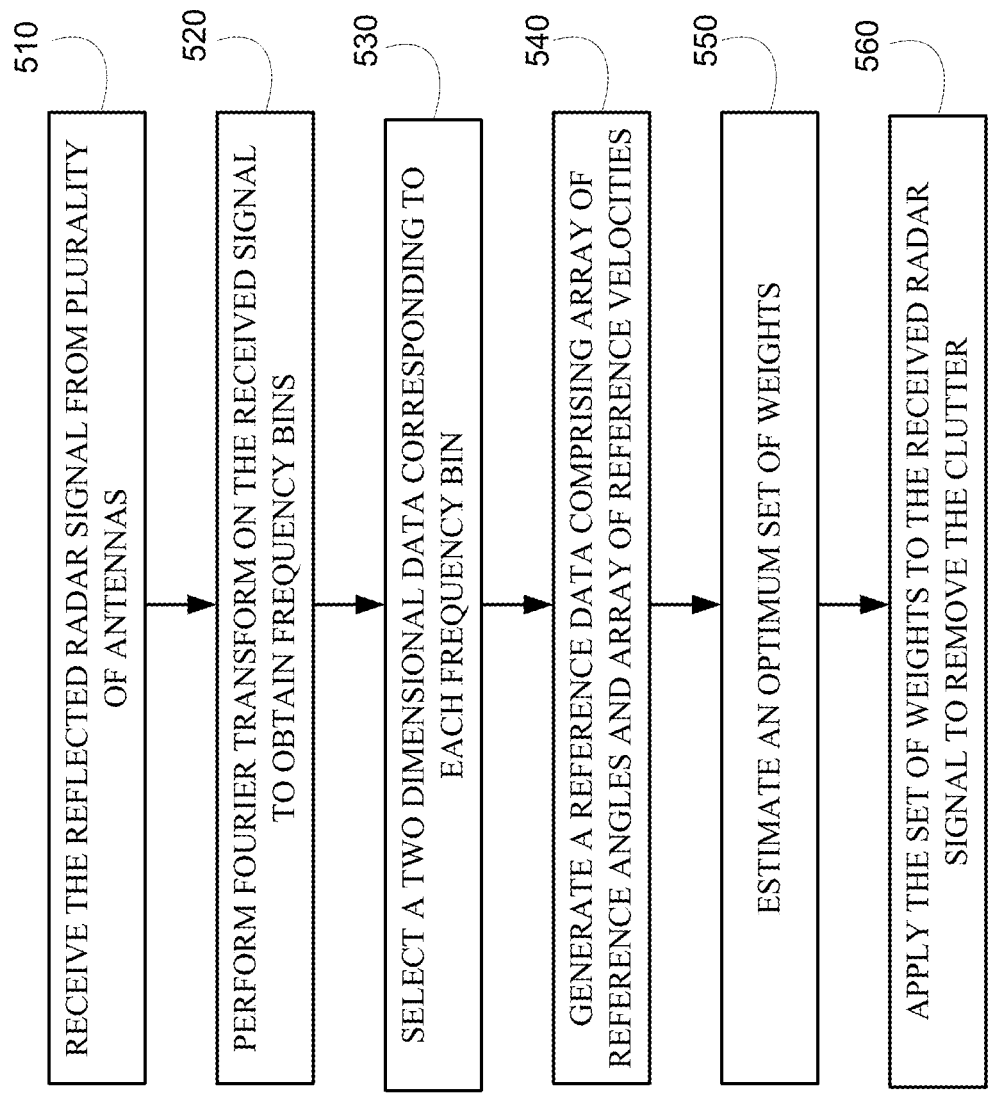
FIG. 5 is a block diagram illustrating manner in which effect of clutter may be reduced in the received radar signal in an embodiment.

FIG. 5 is a block diagram illustrating manner in which effect of clutter may be reduced in the received radar signal in an embodiment. In the block 510, the processor 170 receives the reflected radar signal from plurality of antennas. For example, the reflected radar signal comprises the plurality of chirps received on plurality of antenna elements at plurality of time instants. Thus, in one embodiment the signal received by the processor may be represented in three dimensions (3D) of time, chirp index and antenna index. FIG. 6A illustrates the example received signal for processing in the perspective of 3D data cluster 601. As shown there, the X-axis represents the time, Y-axis representing the chirps and Z-axis representing the antennas. For illustration purpose, Number of Chirps are represented as 610A-K (total K Chirps) and number of antennas are represented as 620A-L (L number antennas), thus, making a three dimensional data cluster of dimension (TXKXL). In that, $T_{PRF}$ is chirp time period.

Figure 6B:
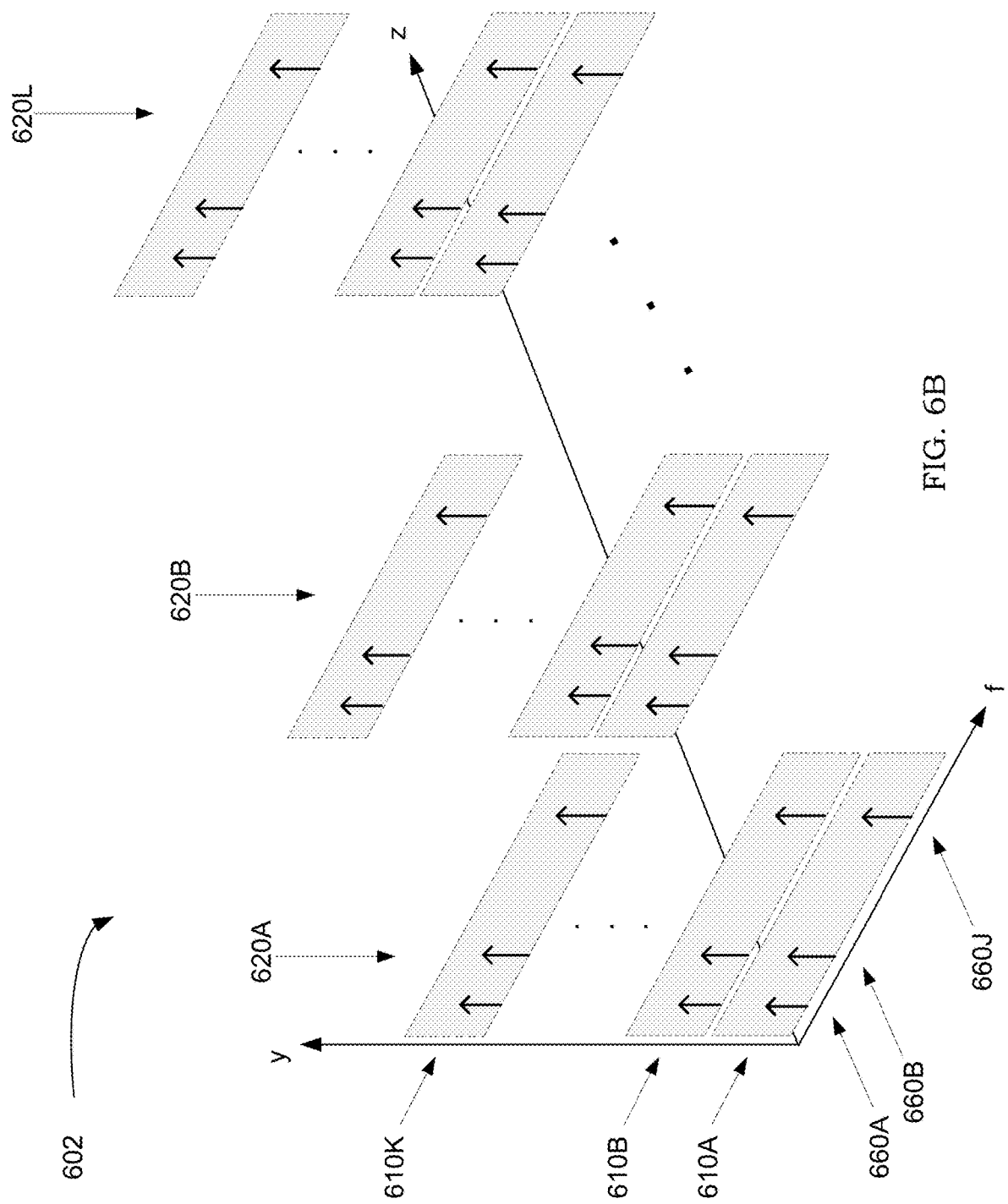
FIG. 6B illustrates the three dimensional data cluster 602 resulting from Fourier transform on the data cluster FIG. 6A

Continuing with FIG. 5, in the block 520, processor 170 performs Fourier Transform (FT) along the X-axis (axis). Thus, on performing Fourier transform in time, the X-axis in the FIG. 6A transform to frequency. In one embodiment, the Fourier transform on each chip 610A-K provides the frequency bins representing the objects/target. FIG. 6B illustrates the three dimensional data cluster 602 resulting from Fourier transform on the data cluster FIG. 6A. As shown there, the X-axis comprises frequency bins, for illustration, for each chirp 610A-K, a J number of frequency bins 660A-J are indicated as resulting from the FT. In one embodiment, the processor 170 may perform FFT (Fast Fourier Transform) on the T samples of each chirp across L antennas and K chirps. Thus, generating T number of frequency bins for every chirps across L antennas and K chirps. Accordingly, the three dimensional transformed data 602 may comprise T number of frequency bins in the x axis for each chirp across L antennas and K chirps.

In block 530, the processor 170 selects a two dimensional (2D) data corresponding to each frequency bin. For example, the processor 170 may select a two dimensional data (KXL) for each frequency bin 660A-J. FIG. 6C illustrates an example two dimensional data 603 selected for the processing. In that, $F_r$ representing the range r (within the 660A-J). In that, the two dimensional data is shown corresponding to data received on antenna array (620 A-L) that may be employed for determining the angle information and corresponding to the chirp array (610A-K) that may be employed for determining the velocity (or Doppler) information for every frequency bin 660A-J.

In block 540, the processor 170 generates a reference data comprising array of reference angles and array of reference velocities for every frequency bins 660A-J. In one embodiment, the reference data may be generated dynamically on determining the frequency bins 660A-J, using the known radar system (100) parameters such as chirp slope, chirp width etc, over an expected velocity and angle range, for example.

In block 550, the processor 170 estimates an optimum set of weights from the 2D data 603 corresponding to range bins 660A-J and the reference data. The set of weight may be estimated as the weights when applied to the received signal (for example data 603) produce the filtered data which may have eliminated the unnecessary targets and clutter from the surrounding.

In block 560, the processor 170 applies the set of weights to the received radar signal to remove the clutter and provide the range, Doppler and angle. Accordingly, the range, Doppler and angle are extracted from the radar received data in one step by applying the set of weights to the received signal. The operations of the processor 170 are further described below in more detail.

In one embodiment, the received data 601 may be sampled at a sampling rate to generate T samples per chirp along the X-axis across L antennas and K chirps, in one time period $T_{PRF}$. Accordingly, the received signal 601 may be represented as data matrix $X_R$ received by a uniform linear array (ULA) of L antennas, across K chirps and T samples per chirp, for every value of t, k, and 1 as:

$$X_R(t, k, l) \approx \alpha_{t,k,l} * R \quad (1)$$
$$\left\{ \exp\left[ \frac{j2\pi(2f_rd_0 + 2f_cv + 2f_rv(k-1)T_{PRF} + 2f_rd\sin\theta(l-1))t}{c} \right] + \exp\left[ \frac{j2\pi f_c[2d_0 + 2d\sin\theta(l-1)]}{c} \right] \right\} + W(t, k, l)$$

in that, $\alpha_{xt,k,l}$ representing the amplitude of the reflected (received) signal, θ representing the angle of the target with respect to the antenna array and W (t, k, l) representing the receiver noise (for example, modelled as a circularly symmetric complex Gaussian random variable with zero mean and unknown variance identically distributed across time), $f_c$ representing the carrier frequency, $f_r$ representing slope of the linear frequency range of FMCW and $f_r$=B/$T_{PRF}$, and $d_0$ representing target distance at time t=0 moving radially away from the radar with a velocity of v m/s, and d representing the distance between two antenna elements on the Antenna array. The manner in which the processor 170 may generate reference data array of reference angles and array of reference velocities as in block 540 is further described below.

In one embodiment, the processor may generate a reference data comprising reference angles and array of reference velocities to create a noiseless ideal data. For illustration, similar to relation (1), a received signal without noise (clutter) may be represented as in relation (1) without the Noise part $W_{(t,k,l)}$. Accordingly, the output of FFT for $k^{th}$ Chirp and $l^{th}$ antenna without the noise may be represented as:

$$F_R(t = kT_{PRF}, k, l) = \frac{2}{c}[f_rd_0 + f_cv + f_rd\sin\theta(l-1) + f_rv(k-1)T_{PRF}] \quad (2)$$

Further, the noiseless signal in time domain may be represented as a matrix for every value of k and l for 0 . . . K and 0 . . . L and for t belong to {1, 2, . . . T}, as:

$$X_1(t) = \begin{bmatrix} \alpha_{t,1,1} \exp\left(j\frac{2\pi}{c}2[f_rd_0 + f_cv]t\right) \cdot 1 & \cdots & \alpha_{t,1,L} \exp\left(j\frac{2\pi}{c}2[f_rd_0 + f_cv]t\right) \cdot \exp\left(j\frac{2\pi}{c}2[f_rd\sin\theta(L-1)]t\right) \\ \alpha_{t,2,1} \exp\left(j\frac{2\pi}{c}2[f_rd_0 + f_cv + f_rvT_2]t\right) \cdot 1 & \cdots & \alpha_{t,2,L} \exp\left(j\frac{2\pi}{c}2[f_rd_0 + f_cv + f_rvT_2]t\right) \cdot \exp\left(j\frac{2\pi}{c}2[f_rd\sin\theta(L-1)]t\right) \\ \vdots & \ddots & \vdots \\ \alpha_{t,K,1} \exp\left(j\frac{2\pi}{c}2[f_rd_0 + f_cv + f_rvT_K]t\right) \cdot 1 & \cdots & \alpha_{t,K,L} \exp\left(j\frac{2\pi}{c}2[f_rd_0 + f_cv + f_rvT_K]t\right) \cdot \exp\left(j\frac{2\pi}{c}2[f_rd\sin\theta(L-1)]t\right) \end{bmatrix} \quad (3)$$

in that, $T_K=(K-1)T_{PRF}$. Considering the frequency bin corresponding to the frequency $f=(2f_rd_0)/2$, the amplitude and phase of the FFT output, corresponding to various k and l indices can be written as:

$$X_1(T_p, f) = \begin{bmatrix} \alpha_{t,1,1} \exp\left(j\frac{2\pi}{c}2[f_cv]T_p\right) & \cdots & \alpha_{t,1,L} \exp\left(j\frac{2\pi}{c}2[f_cv + f_rd\sin\theta(L-1)]T_p\right) \\ \alpha_{t,2,1} \exp\left(j\frac{2\pi}{c}2[f_cv + f_rvT_2]T_p\right) & \cdots & \alpha_{t,2,L} \exp\left(j\frac{2\pi}{c}2[f_cv + f_rvT_2 + f_rd\sin\theta(L-1)]T_p\right) \\ \vdots & \ddots & \vdots \\ \alpha_{t,K,1} \exp\left(j\frac{2\pi}{c}2[f_cv + f_rvT_K]T_p\right) & \cdots & \alpha_{t,K,L} \exp\left(j\frac{2\pi}{c}2[f_cv + f_rvT_K + f_rd\sin\theta(L-1)]T_p\right) \end{bmatrix} \quad (4)$$

in that, Tp is the pulse on duration of the chirp. Hence, the frequency domain samples for each chirp at a specific frequency bin and antenna index, has a similar Kronecker product of two vectors, whose parameters are the antenna index l, chirp index k, steering angle 'sin θ', c representing the velocity of light and the Doppler frequency $f_D$ that is equivalent to $f_cv/c$. In one embodiment, the reference data matrix $X_1(Tp,f)$ in (4), which is a function of angle 'sin θ' and Doppler $f_D$ may be stacked to form a reference data to enable filtering of clutters.

In one embodiment, array response vector representing the response of the antenna array in determining the angle may be represented using relation:

$$a(i, j) = \exp\left\{\frac{j2\pi d(i,j)}{\lambda}\right\} = \exp\left\{\frac{j2\pi}{\lambda}[\sin\theta\cos\phi, \sin\theta\sin\phi, \cos\theta]\begin{bmatrix}(i-1)\Delta x\\(j-1)\Delta y\\0\end{bmatrix}\right\} = \exp\left\{\frac{j2\pi}{\lambda}(i-1)\Delta x\sin\theta\cos\phi + (j-1)\Delta y\sin\theta\sin\phi\right\} \quad (5)$$

in that, i and j representing row (X-direction) and column (Y-direction) of a two dimensional antenna array with total number of antennas L, $\Delta X$ and $\Delta Y$ denote the uniform spacing between the elements in the X and Y-directions respectively, $\lambda$ representing the wave length of the light wave and θ and ø are steering angles in the direction X and Y respectively. The direction X and Y corresponds to azimuth and elevation.

Similarly, the Doppler (velocity) response vector representing response across the chirps may be represented using relation:

$$\phi(t, v) = \left[1, \exp\left(\frac{j2\pi 2(f_rd_0 + f_cv + f_rvT_2)t}{c}\right), \ldots, \exp\left(\frac{j2\pi 2(f_rd_0 + f_cv + f_rvT_K)t}{c}\right)\right] \quad (6)$$

in that, j representing the j th chirp in the K number of Chirps. A stacked vector matrix ($\hat{x}$) for the given angle and the velocity may be represented (from relation 5 and 6) as:

$$\hat{x}=\text{vec}(\alpha)\odot\text{vec}(\phi_k(t,v)\otimes\alpha(\theta,\varphi)) \quad (7)$$

From relation (1) the covariance matrix of $X_R$ for K and L elements for every T samples may be represented in the vector form as:

$$\widehat{R_X} = \frac{1}{T}\sum_{t=1}^{T}\text{vec}(X_R(t))\,\text{vec}(X_R(t))^T, \quad (8)$$

Accordingly the relation (8) is representing the received signal covariance matrix and relation (7) representing the reference data that represent the stacked $X_1(Tp,f)$ for expected angle and velocity. The filter weights that may produce the expected angle and velocity from the received data may be determined using relation:

(9) $w_t = \widehat{R_X}^{-1}\hat{x}$, in that, $\widehat{R_X}^{-1}$ representing the inverse matrix of the $\widehat{R_X}$. The determined weight matrix $w_t$ may be stored as reference weights for filtering the received signal $X_R(t)$. For example, the received signal may be filtered for clutters using the weights as in relation (8) by performing the product with the weight matrix and the received three dimensional signal matrix 601. The resulting product may be represented as:

$Z=\|w_t\text{vec}(X_R)\|$, wherein the z representing the filtered received signal that is free from or at least has reduced clutter. The targets/objects with the range, velocity and angle may be obtained by picking the peaks in Z above a chosen threshold for the corresponding angle and velocity in the reference data. The manner in which the processor 170 may be implemented in an embodiment is further described below.

Figure 7:
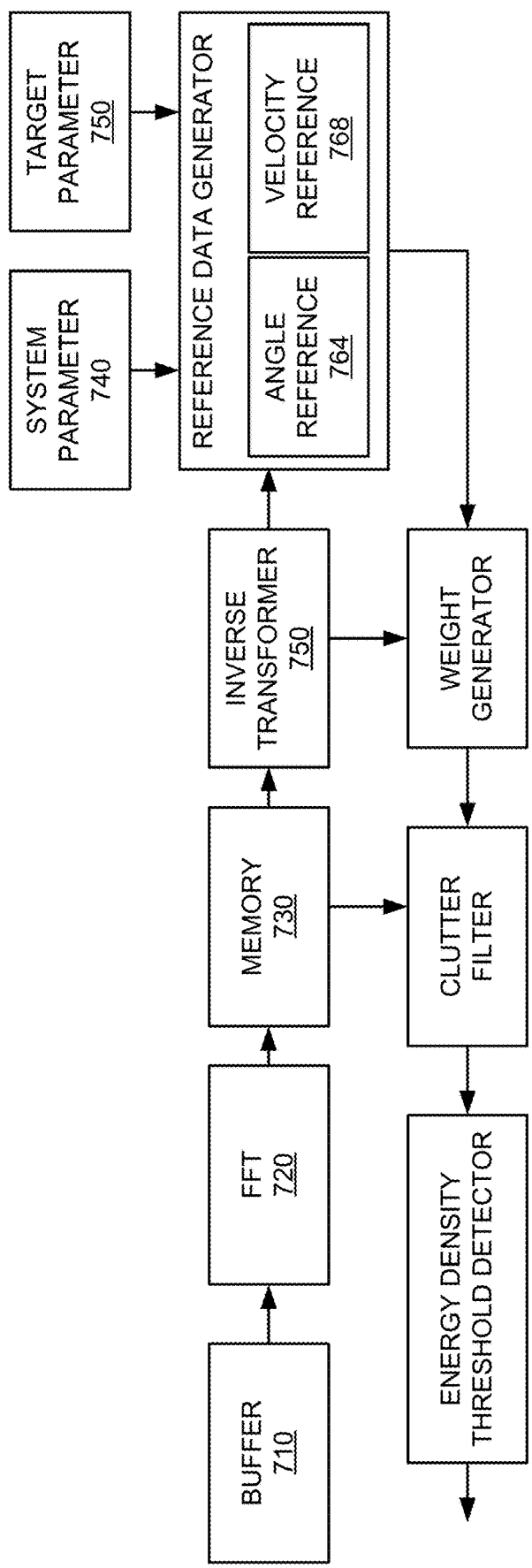
FIG. 7 is a block diagram of an example radar processor in one embodiment.

FIG. 7 is a block diagram of an example radar processor 170 in one embodiment. The radar processor 701 is shown comprising a buffer 710, fast Fourier transformer 720, memory 730, system parameter 740, target parameter 750, inverse transformer 760, reference data generator 760, filter weights generator 770, clutter filter 780 and energy density threshold detector 790. Each element is further described in detail below.

The buffer 710 stores the samples of the received radar signal received on the plurality antenna arranged in one or more dimension. In one embodiment, the buffer 710 stores T samples per chirp for K chirps received on L antenna a totalling T * K * L number of samples. The buffer may be indexed or arranged to store T * K * L in three dimensional matrix for ease of fetching the samples by chirp index and/or antenna index. As an example, the buffer 710 may store the samples similar to the three dimensional data 601 by replacing the chirp band with T samples (not shown as apparent to a person skilled in the art). Further, in case the chirp does not have 100% duty cycle, the buffer may store only the useful portion of the received data (for example data within $t_1$ in FIG. 3).

The Fast Fourier Transformer (FFT) 720 performs FFT operation on the T samples of every chirp to generate T frequency bands. The FFT 720 may fetch T samples at a time by selecting indexes from K and L for performing FFT operation. The frequency bands (bins/components) generated for each index value in K and L are correspondingly stored. For example, the FFT 720 generates T number of frequency bands for every value of K and L, thus making a total T*K*L number of bands/bins. Each frequency bin comprises corresponding frequency value, magnitude/energy density and phase. Alternately the FFT 720 may be configured to generate other number of frequency bands (other than T number of bands) as may be desired for processing to meet several requirements such as hardware, compatibility etc.

The memory 730 stores the frequency bins generated by the FFT 720. In one embodiment the memory 730 may store the frequency bins as three dimensional data depicted in the FIG. 6B similar to 602. The system parameter 740 provides the parameters related to system 101 such as number of chirps, chirp bandwidth, minimum and maximum frequency, time period, duty cycle, number of antennas in the antenna array, antenna array configurations, geometrical information of the array, sampling rate, for example.

The target parameter 750 provides expected and reference target parameters and limits. For example, the target parameter may comprise minimum and maximum speed of a target desired for detection, expected range limits, expected angle limits, terrain details, target size and shape, etc. The target parameters 750 and the system parameters 740 may be dynamically appended with new data or refreshed with new data while the system 101 is deployed. For example, the target data may initially comprise speed of 1 KM/h to 100 Km/h to track multiple category moving object at one time and same may be replaced (refreshed) with 60-80 K/h to track a specific moving object. Alternatively, the target parameters and the system parameters may be stored enabling selective fetching.

The reference data generator 760 is shown comprising angle reference generator 764 and velocity reference generator 768. The angle reference generator 764 generates 2 dimensional arrays of reference angles corresponding to each frequency bin. For example, the angle reference generator may generate T number of 2D matrices each corresponding to one of the frequency bin. In one embodiment, angle reference generator 764 generates the 2D reference angle matrix using one or more of the system parameters 740 and target parameter 750. In one embodiment, the angle reference generator 764 employ relation (5) to generate the angles for each frequency bin corresponding to K chirps and L antennas.

Similarly, in one embodiment, velocity reference generator 768 generates the 2D reference velocity matrix using one or more of the system parameters 740 and target parameter 750. In one embodiment, the velocity reference generator 764 employ relation (6) to generate the velocity for each frequency bin corresponding to K chirps and L antennas. The reference data generator 760 performs Kronecker product on the linearised (vectorised) angle reference matrix provided by 764 and velocity reference matrix provided by the 768 to generate a linearised reference data.

The inverse transformer 750 performs matrix inverse transformation operation of each 2D matrix corresponding to each frequency bin. In one embodiment, the inverse transformation is inverse operation performed on covariance matrix computed from the linearised 2D matrix. In that, the frequency bins of same index is stacked column wise to form the linearised 2D matrix. For example, the data 603 represents an example 2D matrix that may be linearised first and inversed to generate the inverse received matrix.

The filter weights generator 770 determines optimal weights using the inverse matrix received from the inverse transformer 750 and the linearised reference matrix received from the reference data generator 760. In one embodiment, the filter weight generator 770 may employ relation (9) to determine the set of weights. The weights may be stored as reference in the memory for applying in the real time for filtering the clutter. As an alternative, the weights may be computed at regular interval and updated in real time for removing the clutter. The weight may be computed by other well known methods such as Pseudo-inverse, or inverse with regularization.

The clutter filter 780 filters the clutters in the received signal by applying the weights. For example, the clutter filter 780 may be implemented/dynamically adjusted with the weights received from the filter weights generator 770. The received signal is passed through the clutter filter for clutter free detection. For example, the radar system 101 may perform the FFT operation on the received signal and the FFT transformed signal is provided to the clutter filter as shown. In one embodiment, the clutter filter may operate directly on the 2D data. Alternatively, the clutter may operate on the linearised FFT transformed 2D data.

The energy density threshold detector 790 applies a threshold on the energy level of the filtered signal. The frequency bands/bins above the threshold are determined as the valid target and the corresponding angle and velocity data is provided for further processing. In one embodiment, complexity of implantation of the inverse transformer 750 is further reduced. The manner in which the inverse transformer 750 may be implemented in an embodiment is further described below.

Figure 8:
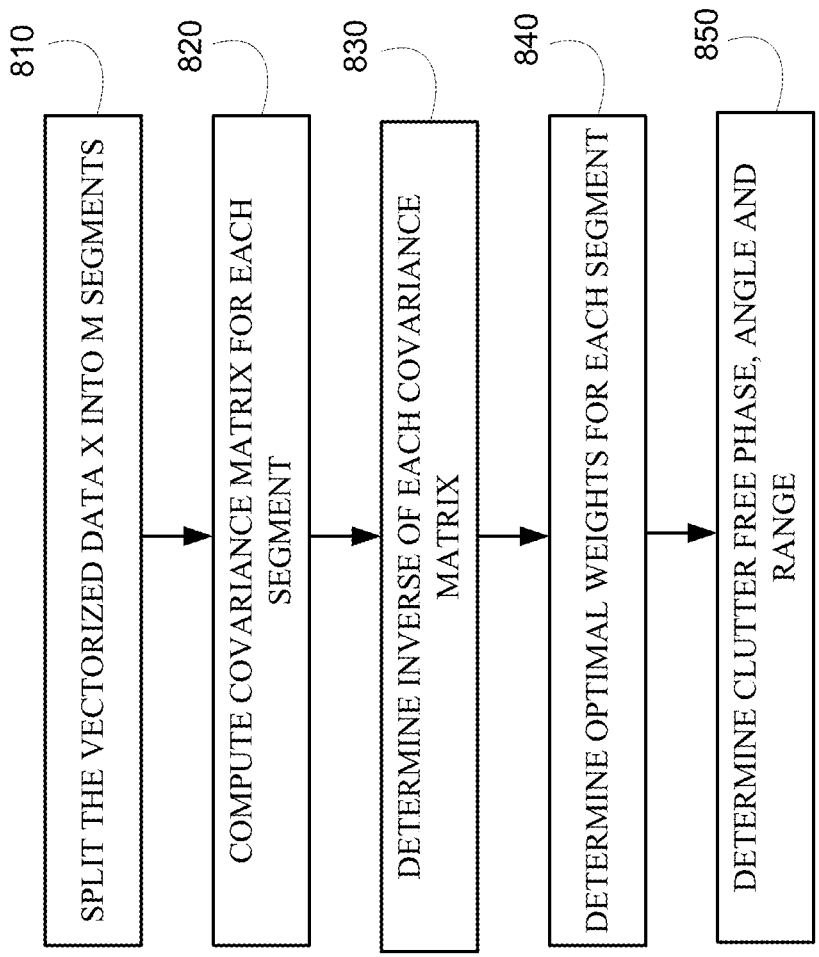
FIG. 8 is a block diagram illustrating the manner in which the inverse transformer and the filtering operation thereof may be implemented with the reduced complexity in one embodiment.

FIG. 8 is a block diagram illustrating the manner in which the inverse transformer and the filtering operation thereof may be implemented with the reduced complexity in one embodiment. In the block 810, the vectorized (linearised) data X (as in relation (4)) is split into M segments with length which is integer multiples of number of antennas. For example, the linearised data X is in the order of 1 X KL. The same may be split into M segments with each segment is of dimension 1 X mL In that, m is an integer number of such that mM=K (number of chirps). The segmented data X may be represented as $X=[X_1, X_2, X_3, \ldots X_i \ldots X_M]$ where $X_i$ has dimension 1 X mL where L is the number of antennas.

In block 820, covariance matrix (similar to relation (7)) is computed for each segment $X_i$ instead of complete X. The covariance matrix corresponding to segment $X_i$ may be represented as: $\hat{R}_{Xi}$. In block 830, the inverse of the covariance matrix $\hat{R}_{Xi}$ is determined and represented as: $\hat{R}_{Xi}^{-1}$. In block 840, optimal weights for each segment is determined as $W_{opt}(i)$ from the $\hat{R}_{Xi}^{-1}$ and the $X_i$ (idealised). In block 850, the clutter free phase, angle and range may be determined using relation:

$$S=\sum_{i=1}^{M}\|W_{opt}^{H}(i)Xi\|^2, \quad (10)$$

Due to segmenting, multiple (M) numbers of smaller dimension matrix Rxi may be inverted with reduced complexity, to an extent of reducing by a factor of $M^2$.

While various embodiments of the present disclosure have been described above, it should be understood that they have been presented by way of example only, and not limitation. Thus, the breadth and scope of the present disclosure should not be limited by any of the above-discussed embodiments but should be defined only in accordance with the following claims and their equivalents.

What is claimed is:

1. Method in a radar receiver system comprising:
receiving a radar signal reflected from a target on a plurality of antennas, wherein the radar signal is a frequency modulated continuous wave (FMCW) signal comprising plurality of chirps;
extracting a plurality of range bins from the radar signal;
generating a plurality of reference angles and a plurality of reference velocities from a plurality of reference parameters;
determining a plurality of reference weights from the plurality of reference angles and plurality of reference velocities;
filtering the radar signal with the filter weights set to equal to the plurality of reference weights.

2. The method of claim 1, further comprising:
sampling the radar signal to generate a plurality of samples in time domain and Fourier transforming the plurality of samples to extract the plurality of range bins for every chirp in the plurality of chirps, wherein the plurality of chirps comprising K number of chirps, the plurality of antennas comprising L number antennas arranged according to an array geometry and the plurality of range bins comprising T*K*L, in that the T is the number of range bins per chirp;
generating a plurality of first reference vectors representing corresponding plurality of reference angles, from the array geometry, in that dimension of the plurality of first reference vectors is equal to L; and
generating a plurality of second reference vectors representing corresponding plurality of reference velocities, from a one or more parameters of the radar signal and a reference target properties, in that the dimension of the plurality of second reference vectors is equal to K.

3. The method of claim 2, further comprising:
generating the plurality of first reference vectors using relation:

$$a(i,j) = \exp\left\{\frac{j2\pi}{\lambda}(i-1)\Delta x \sin\theta\cos\emptyset + (j-1)\Delta y \sin\theta\sin\emptyset\right\},$$

in that, i and j representing the rows and columns of a two dimensional antenna array formed of the plurality of antennas, $\Delta X$ and $\Delta Y$ denote the uniform spacing between the antennas in the X and Y-directions of the array and $\lambda$ representing the wave length of the light wave, $\theta$ and $\emptyset$ are steering angles in the direction X and Y respectively, wherein the X-direction representing Azimuth and Y-direction representing elevation; and
generating the plurality of second reference vectors using relation:

$$\emptyset(t,v) = \left[1, \exp\left(\frac{j2\pi 2(f_r d_0 + f_c v + f_r v T_2)t}{c}\right),\right.$$
$$\left.\ldots, \exp\left(\frac{j2\pi 2(f_r d_0 + f_c v + f_r v T_K)t}{c}\right)\right],$$

in that, j representing the j th chirp in the K number of Chirps, $f_c$ representing the carrier frequency, $f_r$ representing slope of the linear frequency range of the radar signal and $d_0$ representing the reference target distance; and
forming a vectorised linear matrix $\hat{x}$ of the plurality of angles and the plurality of velocities using relation $\hat{x}=\text{vec}(\alpha) \odot \text{vec}(\emptyset_k(t,v) \otimes \alpha(\theta,\varphi))$.

4. Method of claim 3, further comprising:
Determining the plurality of weights ($w_r$) using a relation
$w_r = \widehat{R_X}^{-1} \hat{x}$, in that, the $\widehat{R_X}^{-1}$ representing a inverse of a covariance of a linearised matrix formed from the plurality of range bins T*K*L; and
filtering the radar signal using a relation $Z = \|w_r \text{vec}(X_R)\|$, in that $\text{vec}(X_R)$ representing the linearised plurality of samples in time domain of the radar signal.

5. The method of claim 4, wherein the linearised matrix formed from the plurality of range bins T*K*L comprising plurality of matrices across the plurality of chirps K and the plurality of antennas L for corresponding ones of plurality of range bins T.

6. The method of claim 5, wherein the plurality of weights is applied to filter the radar signal received after the determination of the plurality of weight.

7. The method of claim 6, further comprising:
splitting the linearised matrix formed from the plurality of range bins T*K*L, into a M number of segments to form a subset of received radar signal;
forming covariance and inverse of subset of radar signal; in the subset of radar signal;
determining a subset of weights corresponding to subset of radar signal;
filtering the subset of radar signal by applying the weights to the subset of radar signals to generate a subset of filtered radar signal;
combining the subset of filtered radar signal to form a clutter free radar signal.

8. The method of claim 7, wherein each segment in the M segments are of dimension 1 X mL, in the m is equal to M/K, and the clutter free radar signal is determined using relation $\sum_{i=1}^{M} \|W_{opt}^H(i) Xi\|^2$.

9. The method of claim 4, wherein the covariance of the linearised matrix formed from the plurality of range bins T*K*L is formed using relation:

$$\widehat{R_X} = \frac{1}{T}\sum_{t=1}^{T} \text{vec}(X_R(t)) \text{vec}(X_R(t))^T,$$

in that, $X_R(t)$ representing the samples in time domain of the radar signal.

10. A radar receiver system receiving frequency modulated continues wave (FMCW) radar signal comprising:
a buffer configured to store plurality of samples over an each chirp in the plurality of chirps of the FMCW radar signal received on the plurality antennas arranged in one or more dimension;
Fast Fourier transformer operative to performs FFT operation on the plurality of samples of every chirp to generate a plurality of frequency bins;
memory configured to store the plurality frequency bins;
inverse transformer operative to generate plurality of inverse matrices by performing matrix inverse operation of each matrix of corresponding ones in the plurality of frequency bins;
reference data generator configured to generate linearised reference data comprising reference angles and reference velocities;

filter weights generator operative to determine optimal weights using the plurality of inverse matrices and the linearised reference data;

clutter filter operative to apply the optimal weights to the FMCW radar signal to generate a clutter free radar signal;

energy density threshold detector operative to detect the valid range, velocity and angles that are above a threshold in the clutter free radar signal.

11. The radar receiver system of claim 10, further comprising a transmitter comprising a plurality of transmits antennas configured to transmit the FMCW radar signal, in that, phases shifted version of the FMCW radar signal is transmitted over the plurality of antennas.

* * * * *